United States Patent
Boydston et al.

(10) Patent No.: US 10,688,770 B2
(45) Date of Patent: *Jun. 23, 2020

(54) METHODS FOR SOLID FREEFORM FABRICATION

(71) Applicants: Andrew J. Boydston, Seattle, WA (US); Mark Ganter, Edmonds, WA (US); Duane Storti, Seattle, WA (US); Adam Edward Goetz, Seattle, WA (US); Mete Yurtoglu, Seattle, WA (US); Michael Byrnes Larsen, Seattle, WA (US); Gregory Isaac Peterson, Tacoma, WA (US)

(72) Inventors: Andrew J. Boydston, Seattle, WA (US); Mark Ganter, Edmonds, WA (US); Duane Storti, Seattle, WA (US); Adam Edward Goetz, Seattle, WA (US); Mete Yurtoglu, Seattle, WA (US); Michael Byrnes Larsen, Seattle, WA (US); Gregory Isaac Peterson, Tacoma, WA (US)

(73) Assignees: RICOH CO., LTD., Tokyo (JP); UNIVERSITY OF WASHINGTON, Seattle, WA (US)

(*) Notice: Subject to any disclaimer, the term of this patent is extended or adjusted under 35 U.S.C. 154(b) by 285 days.

This patent is subject to a terminal disclaimer.

(21) Appl. No.: 14/637,062

(22) Filed: Mar. 3, 2015

(65) Prior Publication Data

US 2016/0257067 A1  Sep. 8, 2016

(51) Int. Cl.
*B29C 64/106* (2017.01)
*B33Y 10/00* (2015.01)
*B33Y 30/00* (2015.01)
*B33Y 70/00* (2020.01)

(52) U.S. Cl.
CPC ............ *B33Y 30/00* (2014.12); *B29C 64/106* (2017.08); *B33Y 10/00* (2014.12); *B33Y 70/00* (2014.12)

(58) Field of Classification Search
CPC ... B29C 67/0055; B29C 64/106; B33Y 10/00; B33Y 30/00; B33Y 70/00
See application file for complete search history.

(56) References Cited

U.S. PATENT DOCUMENTS

| | | | |
|---|---|---|---|
| 3,179,614 | A | 4/1965 | Edwards |
| 3,734,888 | A | 5/1973 | Darms |
| 5,998,092 | A | 12/1999 | McCulloch |
| 6,117,612 | A | 9/2000 | Halloran et al. |
| 7,700,020 | B2 | 4/2010 | Nielsen et al. |
| 7,767,132 | B2 | 8/2010 | Patel et al. |
| 8,710,144 | B2 | 4/2014 | Hesse et al. |
| 9,808,993 | B2 | 11/2017 | Boydston et al. |
| 2002/0016386 | A1 | 2/2002 | Napadensky |
| 2003/0032692 | A1 | 2/2003 | Mejiritski et al. |
| 2004/0036200 | A1 | 2/2004 | Patel et al. |
| 2004/0126694 | A1* | 7/2004 | Devoe ...................... G02B 3/06 430/270.1 |
| 2004/0135292 | A1 | 7/2004 | Coats et al. |
| 2004/0187714 | A1 | 9/2004 | Napadensky et al. |
| 2005/0003189 | A1 | 1/2005 | Bredt et al. |
| 2007/0298182 | A1 | 12/2007 | Perret et al. |
| 2008/0152910 | A1 | 6/2008 | Hesse et al. |
| 2008/0241404 | A1 | 10/2008 | Allaman et al. |
| 2010/0140852 | A1 | 6/2010 | Kritchman et al. |
| 2011/0040045 | A1 | 2/2011 | Colquhoun et al. |
| 2012/0231232 | A1* | 9/2012 | Xu ....................... C08G 18/672 428/195.1 |
| 2015/0104660 | A1 | 4/2015 | Malofsky et al. |
| 2016/0075840 | A1 | 3/2016 | Colquhoun et al. |
| 2016/0159984 | A1 | 6/2016 | Sato et al. |
| 2016/0257783 | A1* | 9/2016 | Boydston ............ B29C 67/0055 |
| 2016/0376453 | A1 | 12/2016 | Hearon |
| 2017/0157845 | A1 | 6/2017 | Bihari et al. |
| 2017/0260328 | A1* | 9/2017 | Boydston ............ B29C 67/0055 |
| 2017/0326790 | A1* | 11/2017 | Lee ....................... B29C 64/165 |

FOREIGN PATENT DOCUMENTS

| | | |
|---|---|---|
| DE | 10158233 | 3/2003 |
| DE | 10 2006 040305 | 3/2007 |
| EP | 2 067 606 | 6/2009 |
| JP | 61-141732 | 6/1986 |
| JP | 6-218712 | 8/1994 |
| JP | 8-120075 | 5/1996 |
| JP | 2001-114891 | 4/2001 |
| JP | 2004-508941 | 3/2004 |

(Continued)

OTHER PUBLICATIONS

EP Partial Search Report for EP Application No. EP 16 15 7936 dated Jul. 12, 2016, 6 pages.
EP Extended Search Report for EP Application No. EP 16 15 7935 dated Jul. 12, 2016, 7 pages.
Non-Final Office Action for U.S. Appl. No. 14/991,876 dated Jan. 23, 2017, 8 pages.
Restriction Requirement for U.S. Appl. No. 14/637,070 dated Jan. 27, 2017, 8 pages.
Francis et al., "Diglycidyl Ether of Bisphenol-A Epoxy Resin-Polyether Sulfone/Polyether Sulfone Ether Ketone Blends: Phase Morphology, Fracture Toughness and Thermo-Mechanical Properties", dated Aug. 17, 2006, 11 pages, Colloid and Polymer Science; Kolloid-Zeitschrift Und Zeitschrift Fur Polymere, Springer, Berlin, DE, vol. 285, No. 1.

(Continued)

*Primary Examiner* — Patrick D Niland
(74) *Attorney, Agent, or Firm* — Patent Law Works, LLP

(57) ABSTRACT

The present invention provides methods, processes, and systems for the manufacture of three-dimensional articles of polymer materials using 3D printing. A syringe or an inkjet print head prints a solution of prepolymer onto a build plate. The printed prepolymer is exposed to a stimulus whereby the prepolymer is converted to the polymer. After a predetermined time, sequential layers are printed to provide the three-dimensional article. The three-dimensional article can be cured to produce the 3D article made from the final polymer.

6 Claims, 9 Drawing Sheets

(56) References Cited

FOREIGN PATENT DOCUMENTS

| JP | 2004522622 A | 7/2004 |
|---|---|---|
| JP | 2007-502713 | 2/2007 |
| JP | 2009508723 A | 3/2009 |
| JP | 2010528157 A | 8/2010 |
| WO | WO2008038541 A1 | 3/2008 |
| WO | 2014/077848 | 5/2014 |
| WO | 2015/020019 | 2/2015 |

OTHER PUBLICATIONS

Zhong et al., "Preparation and Properties of UV Irradiation-Induced Crosslinked Sutfonated Poly (ether ether ketone) Proton Exchange Membranes", dated Jan. 20, 2009, 8 pages, Journal of Membrane Science, Elsevier BV, NL, vol. 326, No. 2.

Extended European Search for EP Application No. EP 16 15 7936 dated Oct. 19, 2016, 12 pages.

Notice of Allowance for U.S. Appl. No.14/991,876 dated Mar. 6, 2017, 12 pages.

Non-Final Office Action for U.S. Appl. No. 14/637,070 dated Apr. 19, 2017, 11 pages.

JP Office Action for JP Application No. 2016-040127 dated May 10, 2017, 9 pages

JP Office Action for JP Application No. 2016-040125 dated Jun. 26, 2017, 6 pages.

Notice of Allowance for U.S. Appl. No. 14/637,070, dated Jul. 17, 2017, 7 pages.

Office Action for U.S. Appl. No. 14/991,884, dated Jan. 18, 2018, 23 pages.

Notice of Allowance for U.S. Appl. No. 14/991,884 dated May 5, 2018, 9 pages.

Corrected Notice of Allowability for U.S. Appl. No. 14/991,884 dated May 9, 2018, 4 pages.

Office Action for JP Application No. 2016-040125, dated Oct. 24, 2018, 6 pgs (including translation).

Matsumura, ed., "Kokugojiten(Japanese Dictionary)," published by Ohbunsha, 1990 reprint, p. 497.

Notice of Opposition in JP Application No. 2016-040127, dated Oct. 23, 2019, 24 pgs.

Bruggemann, Oliver, "Prepolymere", Roempp Lexikon der Chemie, Jan. 31, 2011(Jan. 31, 2011), XP055679336, Retrieved from the Internet: URL:https://roempp.thieme.de/9VFUT, [retrieved on Mar. 24, 2020].

EP Office Action for EP Application No. EP 16157936.2 dated Mar. 30, 2020, 7 pgs.

* cited by examiner

METHODS FOR SOLID FREEFORM FABRICATION

FIELD OF INVENTION

The present invention relates to methods and apparatus for creating three-dimensional articles by printing.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink jet process. It is a three-stage process of applying a material, printing a UV-curable liquid, and finally hardened using a UV source. These steps are repeated layer-by-layer. In conventional 3D printing, disclosed in U.S. Pat. Nos. 6,375,874 and 6,416,850, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

U.S. Pat. No. 5,121,329 describes the fused deposition modeling (FDM) process for the production of three-dimensional objects using an extrusion-based, digital manufacturing system. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides methods, processes, and systems for manufacture of three-dimensional articles using 3-D printing. A solution of prepolymer is deposited and exposed to a stimulus that converts the prepolymer to the final polymer. After a predetermined time, sequential layers are printed to provide the three-dimensional article.

In one aspect, a method for manufacturing a three-dimensional article is provided. The method comprises printing the solution of prepolymer on a build plate, exposing the printed solution to a stimulus to form a polymer layer of the three-dimensional article, and repeating the steps (a)-(b) to form remainder of the three-dimensional article.

In another aspect, a three-dimensional article made by the process of printing a solution of prepolymer on a build plate, exposing the printed solution to a stimulus to form a polymer layer of the three-dimensional article, repeating the steps (a)-(b) to form a remainder of the three-dimensional article, and curing the article.

In another aspect, a system for printing a three-dimensional article is provided. The system comprises a printing mechanism for printing a solution of a prepolymer on a build plate to form a layer of the three-dimensional article and a printing controller to repeat the printing mechanism to print the solution of the prepolymer on a polymer formed by exposing the layer to a stimulus at a predetermined condition.

These and other aspects of the present invention will become evident upon reference to the following detailed description.

BRIEF DESCRIPTION OF DRAWINGS

FIG. 2A shows the syringe positioned over a build plate. FIG. 2B shows the syringe printing the prepolymer solution on the build plate in a predefined pattern. FIG. 2C shows the printed prepolymer being exposed to a stimulus for a set period of time. FIG. 2D shows the syringe printing another layer of the prepolymer in a predefined pattern. FIG. 2E shows another layer of the printed prepolymer being exposed to a stimulus for a set period of time. FIG. 2F shows the three-dimensional object being cured.

DETAILED DESCRIPTION

I. Definitions

Figure 1:
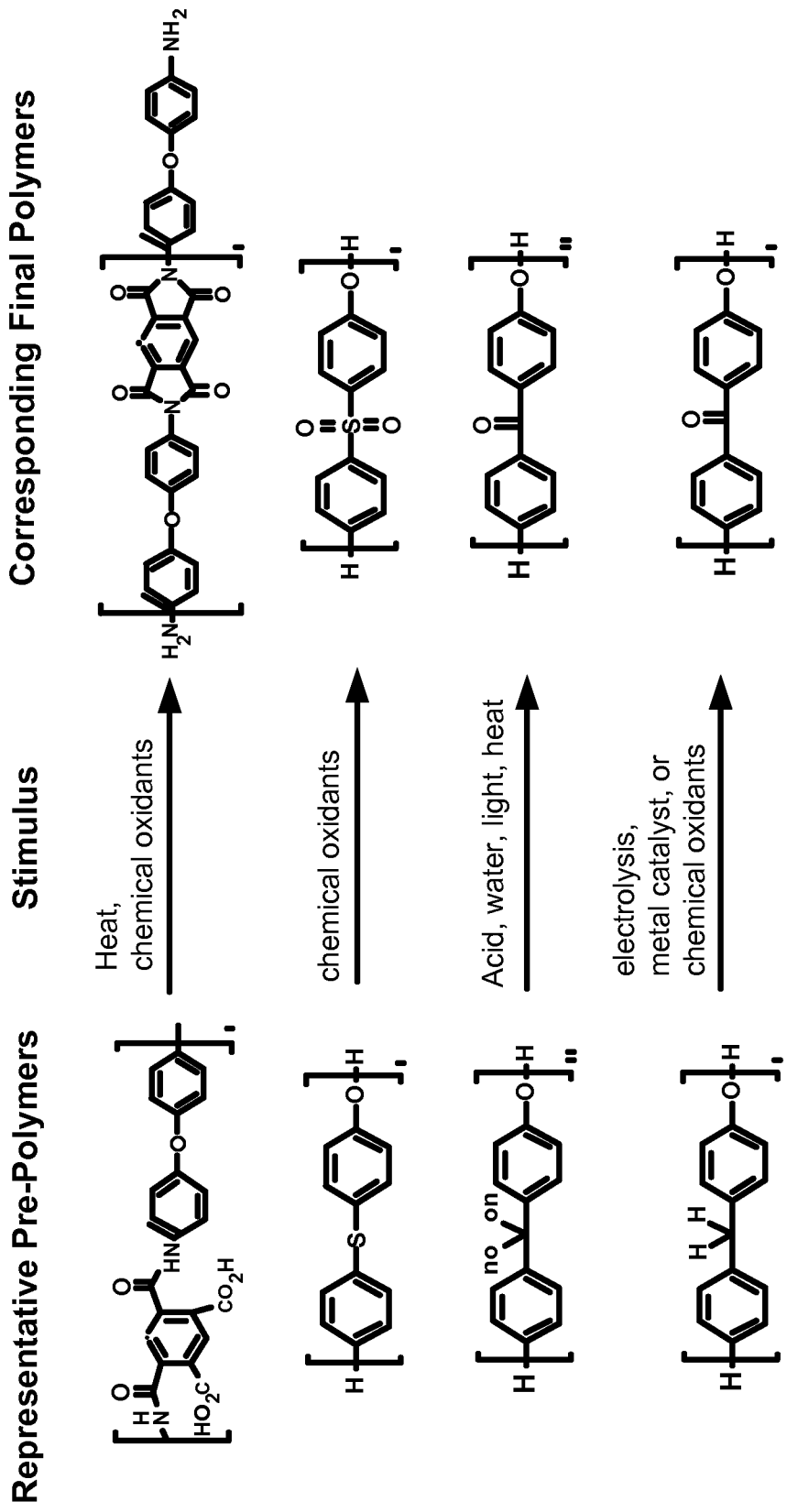
FIG. 1 illustrates representative prepolymers and their corresponding final polymers that can be used to manufacture 3D articles.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

The term "alkyl" means the monovalent branched or unbranched saturated hydrocarbon radical, consisting of carbon and hydrogen atoms, having from one to twenty carbon atoms inclusive, unless otherwise indicated. Examples of alkyl radicals include, but are not limited to, methyl, ethyl, propyl, isopropyl, butyl, isobutyl, sec-butyl, tert-butyl, pentyl, n-hexyl, octyl, dodecyl, and the like.

The term "alkylene" as used herein means the divalent linear or branched saturated hydrocarbon radical, consisting of carbon and hydrogen atoms, having from one to twenty carbon atoms inclusive, unless otherwise indicated. Examples of alkylene radicals include, but are not limited to, methylene, ethylene, trimethylene, propylene, tetramethylene, pentamethylene, ethylethylene, and the like.

The term "alkenylene" means the divalent linear or branched unsaturated hydrocarbon radical, containing at least one double bond and having from two to twenty carbon atoms inclusive, unless otherwise indicated. The alkenylene radical includes the cis or trans ((E) or (Z)) isomeric groups or mixtures thereof generated by the asymmetric carbons. Examples of alkenylene radicals include, but are not limited to ethenylene, 2-propenylene, 1-propenylene, 2-butenyl, 2-pentenylene, and the like.

The term "aryl" means the monovalent monocyclic aromatic hydrocarbon radical consisting of one or more fused rings in which at least one ring is aromatic in nature, which can optionally be substituted with hydroxy, cyano, lower alkyl, lower alkoxy, thioalkyl, halogen, haloalkyl, hydroxyalkyl, nitro, alkoxycarbonyl, amino, alkylamino, dialkylamino, aminocarbonyl, carbonylamino, aminosulfonyl, sulfonylamino, and/or trifluoromethyl, unless otherwise indicated. Examples of aryl radicals include, but are not limited to, phenyl, naphthyl, biphenyl, indanyl, anthraquinolyl, and the like.

As used herein, a "build plate" refers to a solid surface made from material such as glass, metal, ceramic, plastic, polymer, and the like.

The term "halogen" as used herein refers to fluoro, bromo, chloro, iodo, or combinations thereof.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for manufacturing articles made of polymers using three-dimensional printing. The disclosed methods have the advantage of being able to rapidly print three-dimensional articles that have better mechanical properties, better thermal properties, and the like. The disclosed methods are more flexible than other art methods in that they allow the three-dimensional article to be built around another, such as a conducting wire to make a circuit. In addition, the manufactured articles have molecular structural features and physical properties that match those of the final polymers, such as Kapton® polymers, polyketone polymers, and polyethersulfone polymers.

In one application, prepolymer is dissolved in an inert organic solvent to provide a solution of prepolymer. The prepolymer solution is deposited as a layer onto a build plate in a pre-determined pattern related to a cross-section of the object. A stimulus is applied to the deposited layer wherein the prepolymer is converted, at least partially, to the final polymer. Optionally, the deposited layer is held at a predetermined temperature for a predetermined period of time, and then another layer of the prepolymer solution is deposited in the pre-determined pattern. The three-dimensional article is thus manufactured layer-by-layer. Once suitable number of layers have been deposited, the object is optionally removed from the build plate, and cured to provide the three-dimensional article made of a polymer.

III. Polymer

The three-dimensional form can be made from one or more materials. In certain embodiments, the three-dimensional form can comprise polymers. Any type of polymer can be used to form the three-dimensional form, and the polymer can be selected such that the three-dimensional form has the desired properties, and that its prepolymer has greater solubility than the final polymer. Thus, the polymer can be polyimides, polyketones, reduced forms of polyketones, polyethersulfones, and the like. Representative prepolymers and their corresponding final polymers are shown in FIG. 1.

Solvent

The solvent used in carrying out the disclosed methods is preferably an inert organic solvent that is polar, which can have a high boiling point, and in which the prepolymer is soluble, but the final polymer is insoluble or has lower solubility. Examples of the solvent that can be used include solvents having a nitrogen atom in the molecule such as N,N-dimethylacetamide, N,N-diethylacetamide, N,N-dimethylformamide, N,N-diethylformamide, N-methyl-2-pyrrolidone, 2-pyrolydon, N-methyl-2-pyrolydon, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide, tetramethylene sulfone; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; and other solvents such as acetone, dimethylimidazoline, methanol, ethanol, ethylene glycol, dioxane, tetrahydrofuran, pyridine, and tetramethylurea. In addition, amido based solvents can be used, such as $R_3O-(CH_2)_nC(O)NR_1R_2$, where $R_1$, $R_2$, and $R_3$ can be independently selected to be H or lower alkyl, such as methy (Me), ethyl (Et), n-propyl (n-Pr), iso-propyl (i-Pr), n-buty (n-Bu), s-butyl (s-Bu), tert-butyl (t-Bu), and the like. These may be used in combination of two or more. In one aspect, the solvent can be N-methyl-2-pyrrolidone (NMP), N,N-dimethylformamide (DMF), N,N-dimethylacetamide (DMAc), or combinations thereof.

The prepolymer can be dissolved in an organic solvent, such as NMP, DMF, DMAc, or any of the others described in detail above, to provide a 5% solution, a 10% solution, a 15% solution, a 20% solution, a 25% solution, a 30% solution, a 35% solution, a 40% solution, a 45% solution, a 50% solution, and the like. The prepolymer is then printed, and stimulated to provide the final polymer.

Polyimide Polymers

In one aspect, the three-dimensional form can be made from a final polymer that is a polyimide polymer. The polyimide polymer can be selected based on its properties, such as high adhesion properties, high strength, mechanical properties, heat resistance, chemical resistance, electrical insulation, and the like. The polyimide polymers can be prepared by imidization of the poly(amic acid), using methods known in the art. Thus, for example, the poly(amic acid) can be exposed to a stimulus that is heat or a chemical imidization reactant.

The poly(amic acid) is a condensation polymer prepared by reaction of one or more dianhydride and one or more diamine, as shown in the equation below.

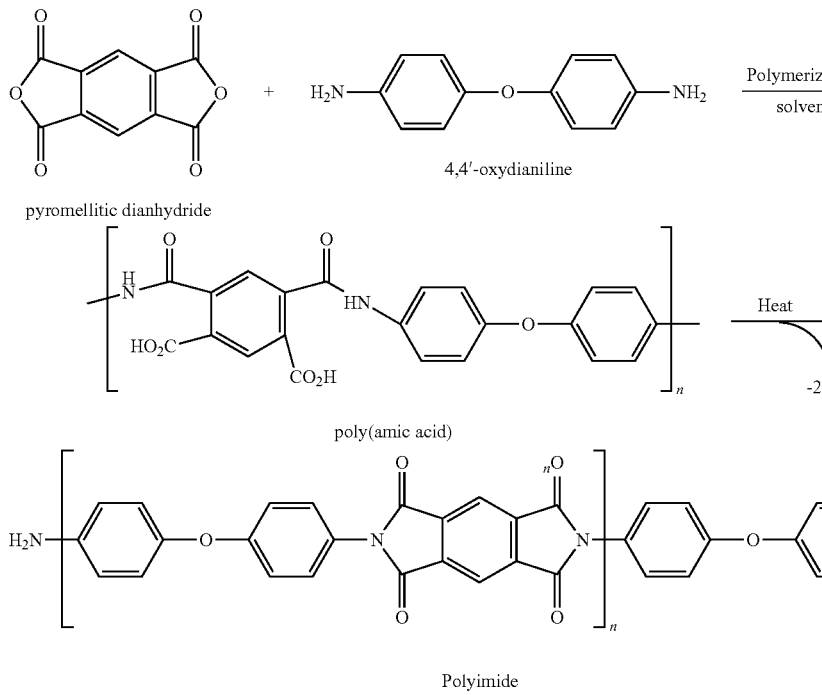

pyromellitic dianhydride 4,4'-oxydianiline poly(amic acid)

Polyimide

Preferably, the dianhydride is an aromatic dianhydride and the diamine is an aromatic diamine. For example, the poly(amic acid) can be prepared by mixing a diamine (5-95 mole % equivalent) with a dianhydride (5-95 mole % equivalent) and allowing the reaction to form the poly(amic acid). The poly(amic acid) can be cured using thermal or chemical imidization to provide the polyimide polymer.

Suitable aromatic dianhydrides include but are not limited to pyromellitic dianhydride (PMDA), biphenyltetracarboxylic dianhydride (BPDA), 3,3',4,4'-benzophenone-tetracarboxylic dianhydride (BTDA), phthalic anhydride (PA) 1,4,5,8-naphthalenetetracarboxylic dianhydride, 2,3,6,7-naphthalenetetracarboxylic dianhydride, 1,4,5,8-naphthalenetetracarboxylic acid, 2,3,6,7-naphthalenetetracarboxylic acid and mixtures thereof. Suitable diamines include but are not limited to oxydianiline (ODA), 1,3-bis(4-aminophenoxy)benzene (RODA), p-phenylenediamine (PPD), m-phenylenediamine (MPD) and mixtures thereof. Preferred dianhydride is PMDA and preferred diamine is ODA.

According to a further embodiment, the dianhydride monomer can be selected from a group consisting of 1,2,4,5-benzene tetracarboxylic dianhydride, 3,3',4,4'-biphenyl tetracarboxylic dianhydride, 4,4'-oxydiphthalic anhydride, benzophenonetetracarboxylic dianhydride, 3,3',4,4'-diphenyl sulfonetetracarboxylic dianhydride, 1,2,5,6-naphthalene tetracarboxylic dianhydride, naphthalenetetracarboxylic dianhydride, bis(3,4-dicarboxyphenyl)dimethylsilane dianhydride, 1,3-bis(4'-phthalic anhydride)-tetramethyldisiloxane and a combination thereof.

According to another embodiment, the diamine monomer can be selected from a group consisting of 1,4 diamino benzene, 1,3 diamino benzene, 4,4'-oxydianiline, 3,4'-oxydianiline, 4,4'-methylene dianiline, N,N'-diphenylethylenediamine, diaminobenzophenone, diamino diphenyl sulfone, 1,5-naphenylene diamine, 4,4'-diamino diphenyl sulfide, 1,3-bis(3-aminophenoxy)benzene, 1,4-bis(4-aminophenoxy)benzene, 1,3-bis(4-aminophenoxy)benzene, 2,2-bis[4-(4-amino phenoxy)phenoxy]propane, 4,4'-bis-(4-aminophenoxy)biphenyl, 4,4'-bis-(3-aminophenoxy)biphenyl, 1,3-bis(3-aminopropyl)-1,1,3,3-tetramethyldisiloxane, 1,3-bis(3-aminopropyl)-1,1,3,3-tetraphenyldisiloxane, 1,3-bis(aminopropyl)-dimethyldiphenyldisiloxane and a combination thereof.

The solvent used in carrying out the disclosed methods is preferably an inert organic solvent that is polar, which can have a high boiling point, and in which the poly(amic acid) is soluble. Examples of the solvent that can be used include solvents having a nitrogen atom in the molecule such as N,N-dimethylacetamide, N,N-diethylacetamide, N,N-dimethylformamide, N,N-diethylformamide, N-methyl-2-pyrrolidone, 2-pyrolydon, N-methyl-2-pyrolydon, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide, tetramethylene sulfone; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; and other solvents such as acetone, dimethylimidazoline, methanol, ethanol, ethylene glycol, dioxane, tetrahydrofuran, pyridine, and tetramethylurea. In addition, amido based solvents can be used, such as $R_3O$—$(CH_2)_nC(O)NR_1R_2$, where $R_1$, $R_2$, and $R_3$ can be independently selected to be H or lower alkyl, such as methy (Me), ethyl (Et), n-propyl (n-Pr), iso-propyl (i-Pr), n-buty (n-Bu), s-butyl (s-Bu), tert-butyl (t-Bu), and the like. These may be used in combination of two or more. In one aspect, the solvent can be N-methyl-2-pyrrolidone (NMP), N,N-dimethylformamide (DMF), N,N-dimethylacetamide (DMAc), or combinations thereof.

A poly(amic acid), as a precursor to a polyimide, can be obtained by polymerizing an aromatic diamine compound and an aromatic dianhydride compound, preferably in substantially equimolar amounts, in an organic polar solvent that is generally a high-boiling solvent. In one embodiment, the molar ratio of the dianhydride monomer to the diamine monomer is from 0.9:1 to 1.1:1. In another embodiment, the mole number of the dianhydride monomer about equal to less than the mole number of the diamine monomer. In a specific embodiment, the molar ratio of the dianhydride monomer to the diamine monomer is about 0.98:1 or 1.0:1.0. The temperature for the reaction is generally not higher than about 200° C., and may be in the range of about −10° C. to about 100° C., preferably in the range of about 20° C. to about 25° C. The time for the polymerization reaction generally is in the range of about 0.2 to 60 hours. Exemplary polyamic acids made by this process are shown below:

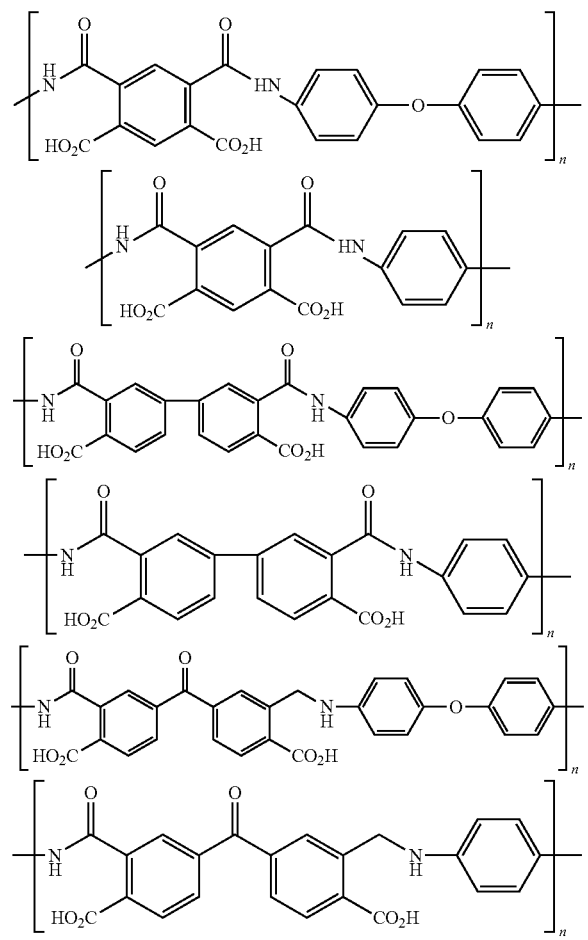

Preferably, the poly(amic acid) has a molecular weight such that the three-dimensional article has high strength and is not brittle. If the molecular weight of the polymer is too low, the three-dimensional article can be too brittle. If the molecular weight is too high, processability can become difficult. The poly(amic acid) preferably have an average molecular weight (in Daltons) from 1,000 to 400,000, more preferably from 10,000 to 350,000, still more preferably from 15,000 to 100,000. Thus, the poly(amic acid) can have an average molecular weight (in Daltons) of about 5,000, 7,000, 10,000, 15,000, 17,000, 19,000, 20,000, 22,000, 23,000, 24,000, 25,000, and the like.

In another aspect, the poly(amic acid) has an average molecular weight (in Daltons) where the molecular weight distribution is in a range of about 500 to about 20,000, preferably a range of about 1,000 to about 10,000, or more preferably, a range of about 3,000 to about 7,000. Thus, the poly(amic acid) can have a molecular weight distribution between about 3,000 to about 5,000, about 10,000 to about 13,000, about 15,000 to about 18,000, about 23,000 to about 27,000, and the like. Alternatively and equivalently, a commercially available poly(amic acid) can be used.

Polyketone Polymers

In one aspect, the three-dimensional form can be made from a final polymer that is a polyketone, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK). If the polyketone polymer is PEEK, it typically can be obtained by reacting a substantially equimolar mixture of at least one aromatic dihydroxy compound and at least one dihalobenzoid compound or at least one halophenol compound, as shown below:

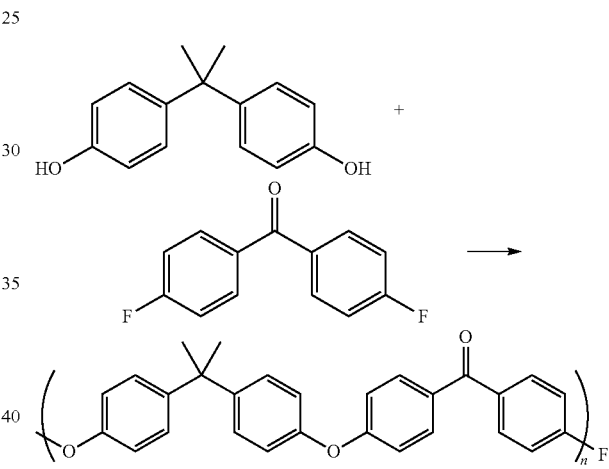

Non-limiting examples of aromatic dihydroxy compounds useful in such a process are hydroquinone, 4,4'-dihydroxybiphenyl and 4,4'-dihydroxybenzophenone. Exemplary suitable aromatic dihydroxy compounds include bis(hydroxyaryl)alkanes such as bis(4-hydroxyphenyl) methane, bis(2-methyl-4-hydroxyphenyl)methane, bis(3-methyl-4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl) diphenylmethane, bis(4-hydroxyphenyl)-1-naphthylmethane, 1,1-bis(4'-hydroxyphenyl)-1-phenylethane, 1,3-bis(4'-hydroxyphenyl)-1,1-dimethylpropane, 2,2-bis(4'-hydroxyphenyl)propane ["Bisphenol A"], 2-(4'-hydroxyphenyl)-2-(3"-hydroxyphenyl)propane, 1,1-bis(4'-hydroxyphenyl)-2-methylpropane, 2,2-bis(4'-hydroxyphenyl)butane, 1,1-bis(4'-hydroxyphenyl)-3-methylbutane, 2,2-bis(4'-hydroxyphenyl)pentane, 2,2-bis(4'-hydroxyphenyl)-4-methylpentane, 2,2-bis(4'-hydroxyphenyl)hexane, 4,4-bis(4'-hydroxyphenyl)heptane, 2,2-bis(4'-hydroxyphenyl)octane, 2,2-bis(4'-hydroxyphenyl)nonane, bis(3,5-dimethyl-4-hydroxyphenyl)methane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl) propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, 2,2-bis(3'-chloro-4'-hydroxyphenyl)propane, 2,2-bis(3',5'-dichloro-4'-hydroxyphenyl)propane, 2,2-bis(3'-bromo-4'-hydroxyphenyl)propane, 2,2-bis(3',5'-dibromo-4'-hydroxyphenyl)propane, 2,2-bis(2',6'-dibromo-3',5'-dimetyl-4'-hydroxyphenyl)propane, bis(4-hydroxyphenyl) cyanomethane, 3,3-bis(4'-hydroxyphenyl)-1-cyanobutane, 2,2-bis(4'-hydroxyphenyl)hexafluoropropane and the like.

Non-limiting examples of dihalobenzoid compounds useful in such a process are 4,4'-difluorobenzophenone, 4,4'-dichlorobenzophenone, 4-chloro-4'-fluorobenzophenone, and the like; non limitative examples of halophenols compounds useful in such a process are 4-(4-chlorobenzoyl) phenol and (4-fluorobenzoyl)phenol. Accordingly, PEEK polymers can be produced by the nucleophilic process as described in, for example, U.S. Pat. No. 4,176,222, or by electrophilically polymerizing the starting materials as described in U.S. Pat. No. 6,566,484. Other poly(aryl ether ketone)s can be produced by starting from other monomers such as those described in U.S. Patent Application No. 2003/0130476. If the polyketone polymer is PAEK, PEK, PEKK, PEEEK, PEEKK, PEKEKK, or PEKKK, they can be synthesized using known methods. Alternatively and equivalently, a commercially available PEEK, PAEK, PEK, PEKK, PEEEK, PEEKK, PEKEKK, or PEKKK polymer can be used.

The prepolymer of the polyketone polymer can be a ketal, where one or more of the carbonyl group ($>C=O$) can be converted to a diether ($>C(OR)_2$), where each R can be independently selected to be alkyl, alkylene, alkenylene, aryl, or combination thereof. The ketal can be produced by reaction of the carbonyl group with, for example, an alcohol, such as a primary alcohol, a secondary alcohol, a tertiary alcohol, or a combination thereof. The ketal can be acyclic, cyclic, or spiro cyclic ketal. The prepolymer of the polyketone polymer can also be a thioketal, a dithioketal, or a hemiketal. The ketal, hemiketal, thioketal or dithioketal can be obtained by reacting the dihalobenzoid compound with the alcohol or with a thiol, as shown below:

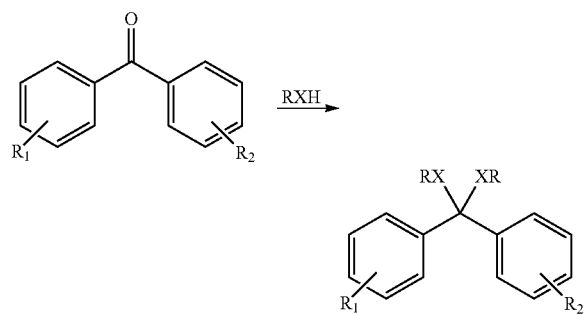

where X can be a hetero atom, such as oxygen or sulfur. Examples of suitable monofunctional alcohols include methanol, ethanol, various linear and branched isomers of propanol, butanol, pentanol, hexanol, octanol, nonanol, decanol, undecanol, dodecanol, tetradecanol, cetyl alcohol, and stearyl alcohol; cycloalkyl alcohols such as cyclohexanol, cyclooctanol, norbornyl alcohol, and the like; alkynyl alcohols such as ethynyl alcohol, 3-methylpent-1-yn-3-ol, tetradec-9-ynol, and the like; aryl and alkaryl alcohols such as phenol, benzyl alcohol, toluol, xylyl alcohol, 5-phenyl-pentanol, and the like; and alcohols having various functional groups, for example 1,1,1-trichloro-2-methyl-2-propanol, 5-fluoro-1-pentanol, 5-amino-1-pentanol, 5-benzyloxy-1-pentanol, 5-methoxy-1-pentanol, 3-nitro-2-pentanol, 4-methylthio-1-butanol, 6-hydroxyhexanoic acid, lactamide, and the like. In some embodiments, the ketal can by a cyclic ketal formed by the reaction of polyols with the carbonyl moieties. Examples of suitable polyols include 1,2-ethanediol (ethylene glycol), 1,2-propanediol (propylene glycol), 1,3-propanediol, 1,2,3-propanetriol (glycerol), diglycerol (a mixture of glycerol dimers coupled at primary and secondary hydroxyl moieties), 2,2-dimethyl-1,3-propanediol (neopentyl glycol), 3-mercaptopropane-1,2-diol (thioglycerol), dithiothreitol, 1,1,1-trimethylolpropane, 1,2-butanediol, 1,3-butanediol, pentaerythritol, cyclohexane-1,2-diol, 1,4-dioxane-2,3-diol, and the like.

The ketal, hemiketal, thioketal or dithioketal can then be used as the prepolymer starting material for performing the polymerization reaction wherein the final polymer is produced. Alternatively, the polymer can first by obtained, and at least one of the carbonyl groups can then be converted to a ketal, hemiketal, thioketal or dithioketal to provide the prepolymer.

When the prepolymer is a ketal, the carbonyl group of the ketone moiety can be readily regenerated by hydrolysis using water, acidic solution, heat, light, base catalysis, catalytic hydrogenation, or a combination thereof. For example, the prepolymer can be converted to the final polyketone polymer using astimulus that is a Brønsted acid or a Lewis acid based reagent. Thus, for example, dilute solution of hydrochloric acid, hydrobromic acid, perchloric acid, acetic acid, sulfuric acid, arylsulfonic acids and hydrates thereof, such as p-toluenesulfonic acid monohydrate, phosphoric acid or orthophosphoric acid, polyphosphoric acid, sulfamic acid, and the like can be used as the stimulus. In other embodiments, the acid catalysts employed are aprotic, also referred to as Lewis Acids. Such Lewis acid catalysts can include, for example, titanium tetrachloride, aluminum trichloride, boron trifluoride, stannic chloride, and the like. In some embodiments, more than one type of acid catalyst is used; thus, blends of one or more of the acids mentioned above may be used in a mixture to catalyze the reactions.

The prepolymer can be converted to the final polyketone polymer by application of light as the stimulus. The light can be ultraviolet, infrared, visible, or combination thereof. The light sources are conventionally well known in the art, and include a low-pressure, a medium-pressure or a high-pressure mercury lamp, and a metal halide lamp, a xenon lamp, a cathode tube, a LED, and the like. In one embodiment, the application of light can be under neutral conditions, optionally in the presence of a catalyst, such as iodine, indium(III) trifluoromethane-sulfonate or tetrakis(3,5-trifluoromethyl-phenyl)borate, a Lewis acid catalyst, and the like.

The prepolymer of the polyketone polymer can be the reduced form of the polyketone, as shown in FIG. 1, where one or more of the carbonyl group ($>C=O$) has been converted to a $CH_2$ group. When the prepolymer is a reduced form of the polyketone, the carbonyl group of the ketone moiety can be readily regenerated by exposing the prepolymer to a stimulus, such as, electrolysis, metal catalyst, or a chemical oxidant, as is known in the art.

Polyethersulfone Polymers

In another aspect, the three dimensional object can be made from a final polymer that is a polysulfone polymer. Polysulfones, as used herein, refers to a family of polymers which contain the subunit -aryl-SO$_2$-aryl-, more specifically -aryl-SO$_2$-aryl-O—, as shown below:

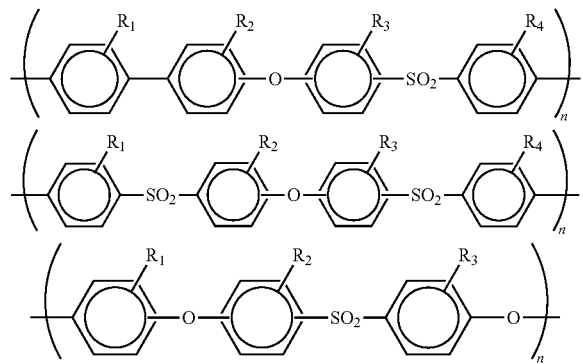

where R$_1$, R$_2$, R$_3$, R$_4$ are independently selected to be an alkyl, an alkylene, an aryl, or a halogen. Aromatic polyethersulfones can be prepared, for example, by the reaction of dialkali metal salts of diphenols with dihalodiarylsulfones in a solvent. The dialkali salts of diphenols may also be produced in situ or may be produced in a separate reaction. The diphenols can be any one as described above or known in the art. The polysufones includes a polymer of 4-[2-(4-hydroxyphenyl)propan2-yl]phenol and 4-(4-hydroxyphenyl)sulfonylphenol, commonly known as polysulfone, and a polymer of benzene-1,4-diol and 4-(4-hydroxyphenyl)sulfonylphenol commonly known as polyethersulfone. Polyethersulfone (PES) is also known as polyarylethersulfone (PAES) and/or polyphenylsulfone (PPSU). Another suitable polysulfone is a copolymer of 4-(4-hydroxyphenyl)phenol and 4-(4-hydroxyphenyl)sulfonylphenol, also known as polyphenylsulfone. Other exemplary polysulfones are described in U.S. Pat. No. 5,911,880.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and lower amounts of oligomers. British patent GB 1,264,900 teaches a process for production of a polyethersulfone comprising structural units derived from 4,4'-biphenol, bisphenol-A (4,4'-isopropylidenediphenol), and 4,4'-dichlorodiphenylsulfone. Thus, the polysulfone polymers can be synthesized using known methods. Alternatively and equivalently, commercially available polysulfone polymers can be used.

The prepolymer of the polyethersulfone can be the corresponding polysulfide. The prepolymer comprising the polysulfide can be converted to the final polyethersulfone polymer by means of a stimulus, such as an oxidant. Thus, for example, the prepolymer comprising the polysulfides can be contacted with a stimulus that is an oxidant for a sufficient time to oxidize the sulfur atom in the prepolymer to a sulfone. The oxidant can be an organic peroxy acid, an organic peroxide, an inorganic peroxide, elemental halides (Br$_2$ or Cl$_2$) in combination with hydroxide, or mixtures thereof. Thus, the oxidant can be bromine or chlorine in the presence of water, ozone, osmium tetroxide, permanganates, hydrogen peroxide, alkyl hydroperoxides and percarboxylic acids as, for example, performic acid, peracetic acid or perbenzoic acids. Suitable oxidizers include organic peroxy acids such as carboxylic peracids, preferably carboxylic per acids having 2 or more carbon atoms, more preferably peracetic acid; organic peroxides such as t-butyl hydrogen peroxide; inorganic peroxides such as hydrogen peroxide, perborates, persulfates; and mixtures thereof such as carboxylic acid hydrogen peroxide mixtures.

One category of suitable organic peracids includes peracids of an organic aliphatic monocarboxylic acid having 1-5 carbon atoms, such as formic acid, acetic acid (ethanoic acid), propionic acid (propanoic acid), butyric acid (butanoic acid), iso-butyric acid (2-methyl-propanoic acid), valeric acid (pentanoic acid), 2-methyl-butanoic acid, iso-valeric acid (3-methyl-butanoic) and 2,2-dimethyl-propanoic acid. Organic aliphatic peracids having 2 or 3 carbon atoms, e.g., peracetic acid and peroxypropanoic acid, can also be used. Suitable organic peracids includes peracids of a dicarboxylic acid having 2-5 carbon atoms, such as oxalic acid (ethanedioic acid), malonic acid (propanedioic acid), succinic acid (butanedioic acid), maleic acid (cis-butenedioic acid) and glutaric acid (pentanedioic acid). Peracids having between 6-12 carbon atoms that can be used as oxidants include peracids of monocarboxylic aliphatic acids such as caproic acid (hexanoic acid), enanthic acid (heptanoic acid), caprylic acid (octanoic acid), pelargonic acid (nonanoic acid), capric acid (decanoic acid) and lauric acid (dodecanoic acid), as well as peracids of monocarboxylic and dicarboxylic aromatic acids such as benzoic acid, salicylic acid and phthalic acid (benzene-1,2-dicarboxylic acid). Other suitable oxidizers include peroxynitrous acid and its salts, peroxyphosphoric acids and their salts, peroxysulfuric acids and their salts, such as peroxymonosulfuric and peroxydisulfuric acids, and their salts, sodium periodate, potassium perchlorate, and the like. Other active inorganic oxygen compounds can include transition metal peroxides, and other such peroxygen compounds, and mixtures thereof. The amount of oxidizer is preferably sufficient for the conversion of a sulfur compound to a sulfone.

IV. Printing

The prepolymer solution can be used in a process to create three-dimensional articles using a three-dimensional printing system. A three-dimensional printing system can have a computer, a three-dimensional printer, and a reservoir containing a solution of the prepolymer. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). The computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

The prepolymer solution may be printed by any printing mechanism. For example, printing may comprise inkjet printing, single jet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the prepolymer solution in a predefined pattern.

In one aspect, the three-dimensional article can be formed by using a syringe or syringe-like dispenser to print the prepolymer solution on a build plate, as shown in FIG. 2. The build plate can be made from a suitable material that is selected due to its properties, such as good thermal conductivity, surface properties that allow for uniform coating and stability of reagent, or neutrality to the solvent system, and combinations thereof. Thus, the build plate can be made from glass, ceramic, metal, flexible polymer, or harder polymer.

Typically, the syringe deposits a first layer of the prepolymer solution onto the build plate in a two-dimensional pattern. The syringe, such as Norm-Ject Luer Lock plastic syringes, preferably has a small orifice diameter, thereby enabling the formation of electronic features having a fine minimum feature size. In one aspect, the syringe or other deposition tool includes a deposition orifice having a diameter of not greater than about 200 µm, more preferably not greater than 100 µm, more preferably not greater than 50 µm and even more preferably not greater than about 25 µm. The print speed is dependent on feature size and materials used, and can be easily determined by one of skill in the art and adjusted as desired. Thus, for example, when the prepolymer is poly(amic acid) that is being printed on a metal build plate, the print speed can be between about 1 mm/sec to about 1000 mm/sec, about 5 mm/sec to about 500 mm/sec, about 20 mm/sec to about 100 mm/sec, or about 10 mm/sec to about 50 mm/sec. Thus, the print speed can be between about 5 mm/sec to about 30 mm/sec, or between about 10 mm/sec to about 20 mm/sec.

The deposited prepolymer solution can be contacted with a stimulus wherein the prepolymer is converted, at least partially, to the final polymer. Partially polymerized means that some reactive groups present in the prepolymers are present after polymerization, i.e., not all prepolymer is converted to the final polymer. This means that more than 0% of the number of reactive groups, or more than about 10%, or more than about 25% of the reactive groups remain unreacted.

As described in detail above, the selected stimulus is dependent on the prepolymer, and can be heat, chemical oxidants, acids, light, electrolysis, metal catalysts, and the like. Thus, for example, if the deposited prepolymer is poly(amic acid), the selected stimulus can be heat, The deposited poly(amic acid) solution is preferably heated to a temperature that is less than about 200° C., and may be in the range of about 100° C. to 170° C., preferably in the range of about 110° C. to about 150° C. The build plate can be heated to a build temperature of about 100° C., 110° C., 120° C., 130° C., 140° C., 150° C., 160° C., and the like. The deposited poly(amic acid) solution can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the poly(amic acid) solution using a laser or a laser diode, such as, for example, a scanning carbon dioxide laser.

The first layer of the prepolymer is exposed to the stimulus for a preset period of time. The period of time can be easily determined by one of skill in the art and adjusted as desired, and is selected to allow the prepolymer to partially or fully convert to the final polymer before the next layer is deposited. Thus, for example, if the first layer of deposited prepolymer is poly(amic acid), the deposited poly(amic acid) solution is allowed to stay on the plate at the preset temperature for about 1 minute to about 2 hours, preferably about 5 minutes to about 30 minutes, more preferably about 8 minutes to about 15 minutes, or from about 1 sec to about 300 sec, preferably about 5 sec to about 30 sec, more preferably about 8 sec to about 15 sec. Thus, the poly(amic acid) solution can be allowed to stay on the plate at the preset temperature for about 7 minutes, about 8 minutes, about 9 minutes, about 10 minutes, about 11 minutes, about 12 minutes, about 13 minutes, about 14 minutes, about 15 minutes, and the like. Without being bound to a theory, the holding period allows volatile components of the fluid, such as the solvent, to evaporate, and the layer to partially cure to partially form the polyimide polymer. Thus, the holding time is selected such that the poly(amic acid) can partially polymerize.

A second layer or film of the poly(amic acid) solution is then applied over the first. The second application of fluid follows in the manner described above, and the second layer is allowed to partially cure for a predetermined period of time on the build plate.

The previous steps of applying a layer of the poly(amic acid) solution and allowing it to stay on the build plate for a predetermined period of time are repeated until the final article is completed. Thus, a three-dimensional article can be build layer by layer by printing a series of poly(amic acid) solution layers on a build plate.

Figure 2A:
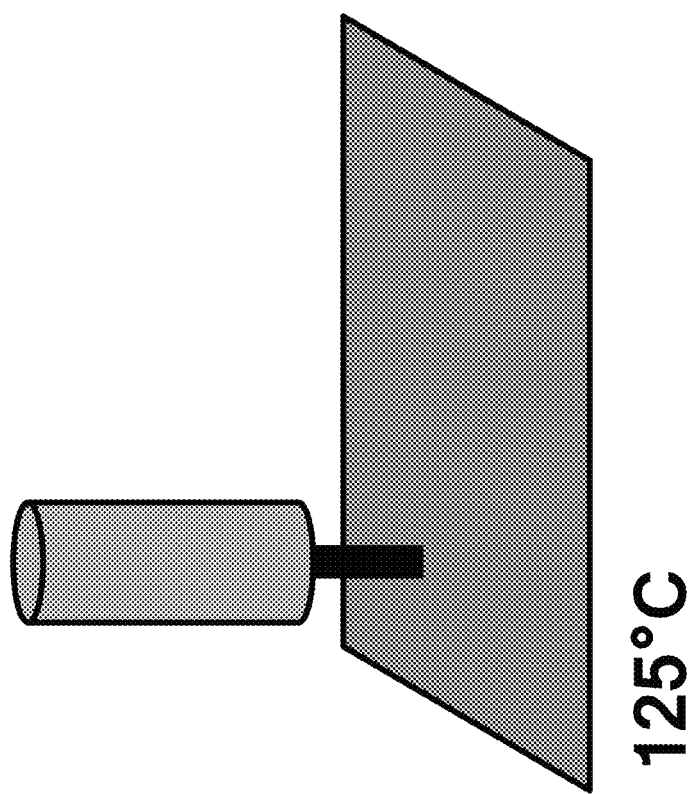
FIGS. 2A-2F illustrate a method of printing a three-dimensional article using a syringe.
Figure 2B:
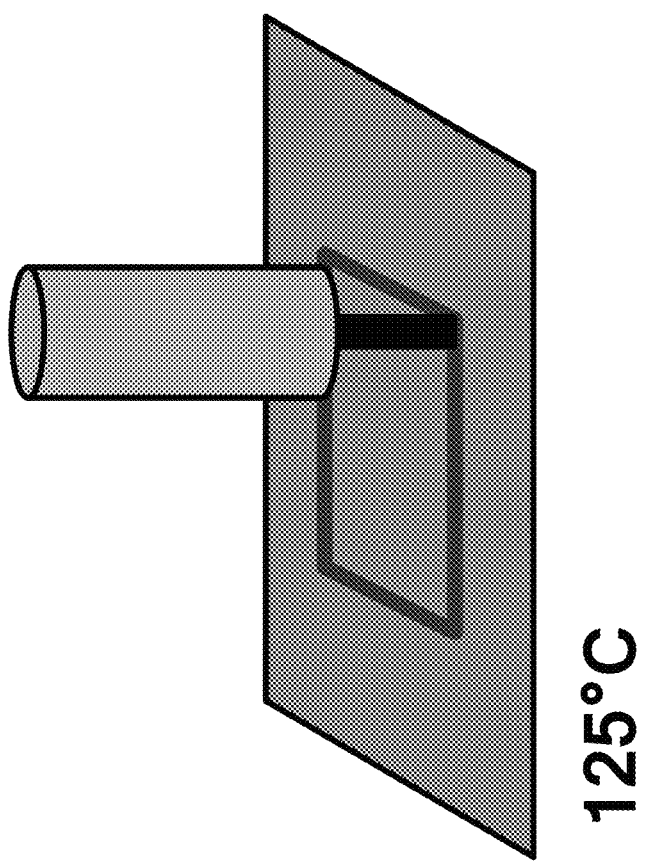
Figure 2C:
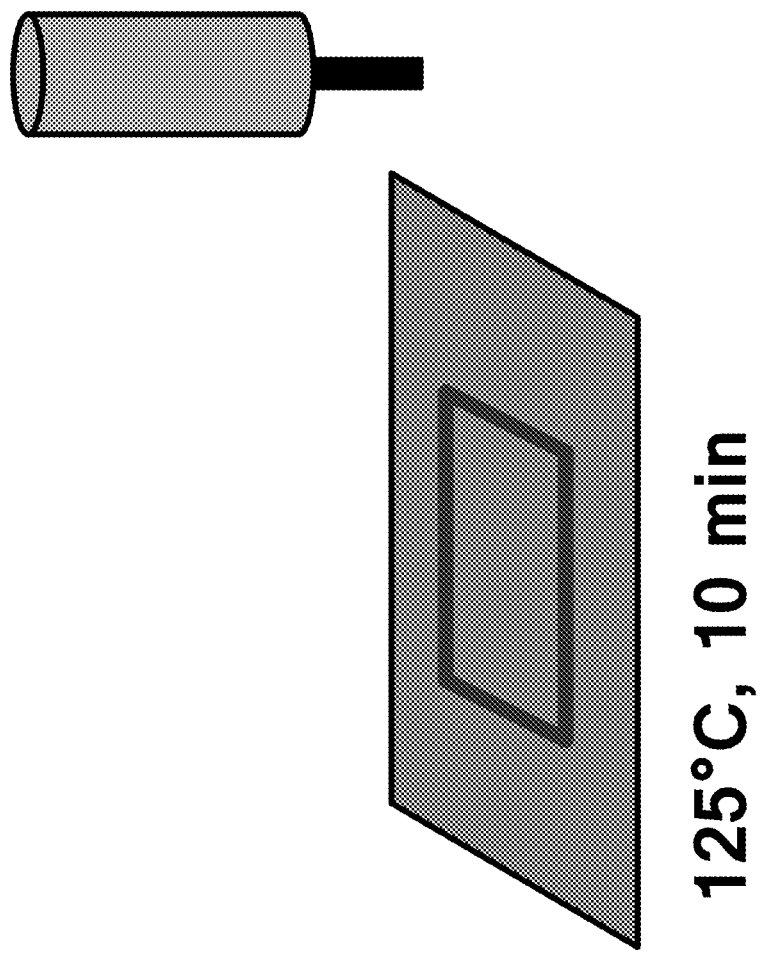
Figure 2D:
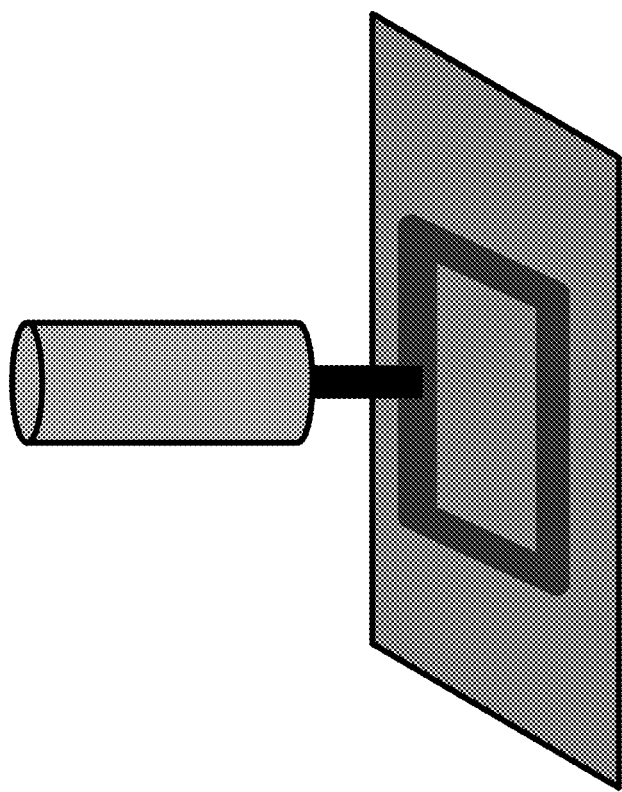
Figure 2E:
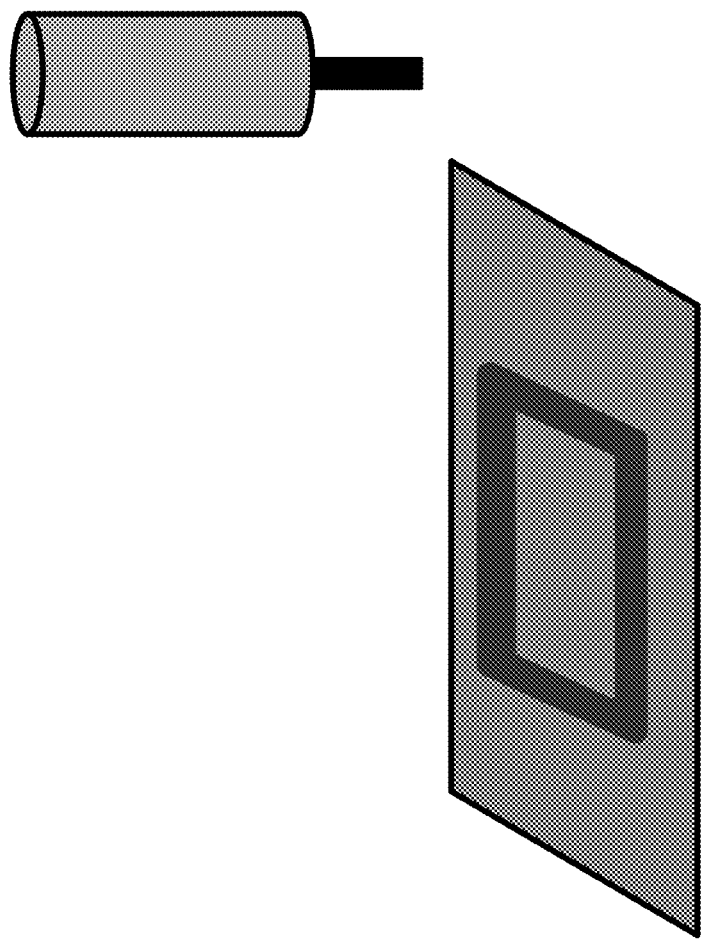
Figure 2F:
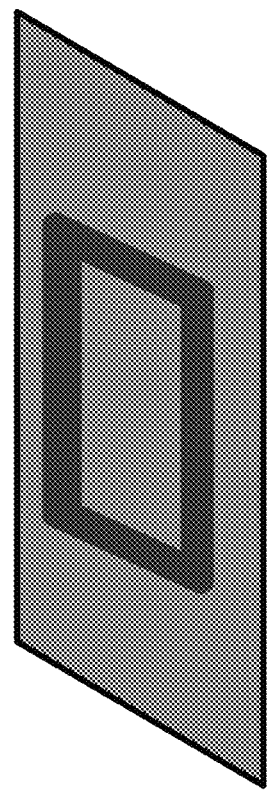

Referring to FIG. 2 again, a method of printing a three-dimensional article using a syringe is illustrated therein. FIG. 2A shows the syringe positioned over a rectangular build plate. The build plate is inductively heated to about 125° C. As shown in FIG. 2B, the syringe is used to print the prepolymer solution on the build plate in a predefined rectangular pattern. Once the first layer of the prepolymer solution has been printed, it is held at the build temperature for about 10 minutes, as shown in FIG. 2C. After the hold time, FIG. 2D shows the syringe printing another layer of the prepolymer solution in the predefined pattern, and FIG. 2E shows the new layer of prepolymer solution being held at the build temperature for about 10 minutes. The process is repeated until the desired thickness of the three-dimensional article is achieved. The three-dimensional article can be cured, as shown in FIG. 1F, to provide the final three-dimensional article comprising the final polymer.

In another aspect, the three-dimensional printer uses an ink jet type print cartridge to deposit prepolymer solution from the ink jets onto a build plate Ink jet print heads that can be used in the disclosed methods include MH5420, MH2480, MH2420, and MH1801, all available from Ricoh Printing Systems America, Inc. As described in detail above, the build plate can have any shape, such as rectangular, circular, oval, curved, and the like. The build plate can be made from a suitable material that is selected due to its properties, such as good thermal conductivity, surface properties that allow for uniform coating and stability of reagent, and neutrality to the solvent system. Thus, the build plate can be made from glass, ceramic, metal, flexible polymer, or harder polymer.

Typically, an ink-jet nozzle deposits a first layer of the prepolymer solution onto the build plate in a two-dimensional pattern. The deposited prepolymer solution can be contacted with a stimulus wherein the prepolymer is converted, at least partially, to the final polymer. As described in detail above, the selected stimulus is dependent on the prepolymer, and can be heat, chemical oxidants, acids, light, electrolysis, metal catalysts, and the like. The first layer of the prepolymer is exposed to the stimulus for a preset period of time that is selected to allow the prepolymer to partially or fully convert to the final polymer before the next layer is deposited.

A second layer or film of the prepolymer solution is then applied over the first. The second application of fluid follows in the manner described above, and the second layer is allowed to partially cure for a predetermined period of time on the build plate.

The previous steps of applying a layer of the prepolymer solution and allowing it to stay on the build plate for a predetermined period of time are repeated until the final article is completed. Thus, a three-dimensional article can be built layer by layer by printing a series of prepolymer solution layers on a build plate.

Figure 3:
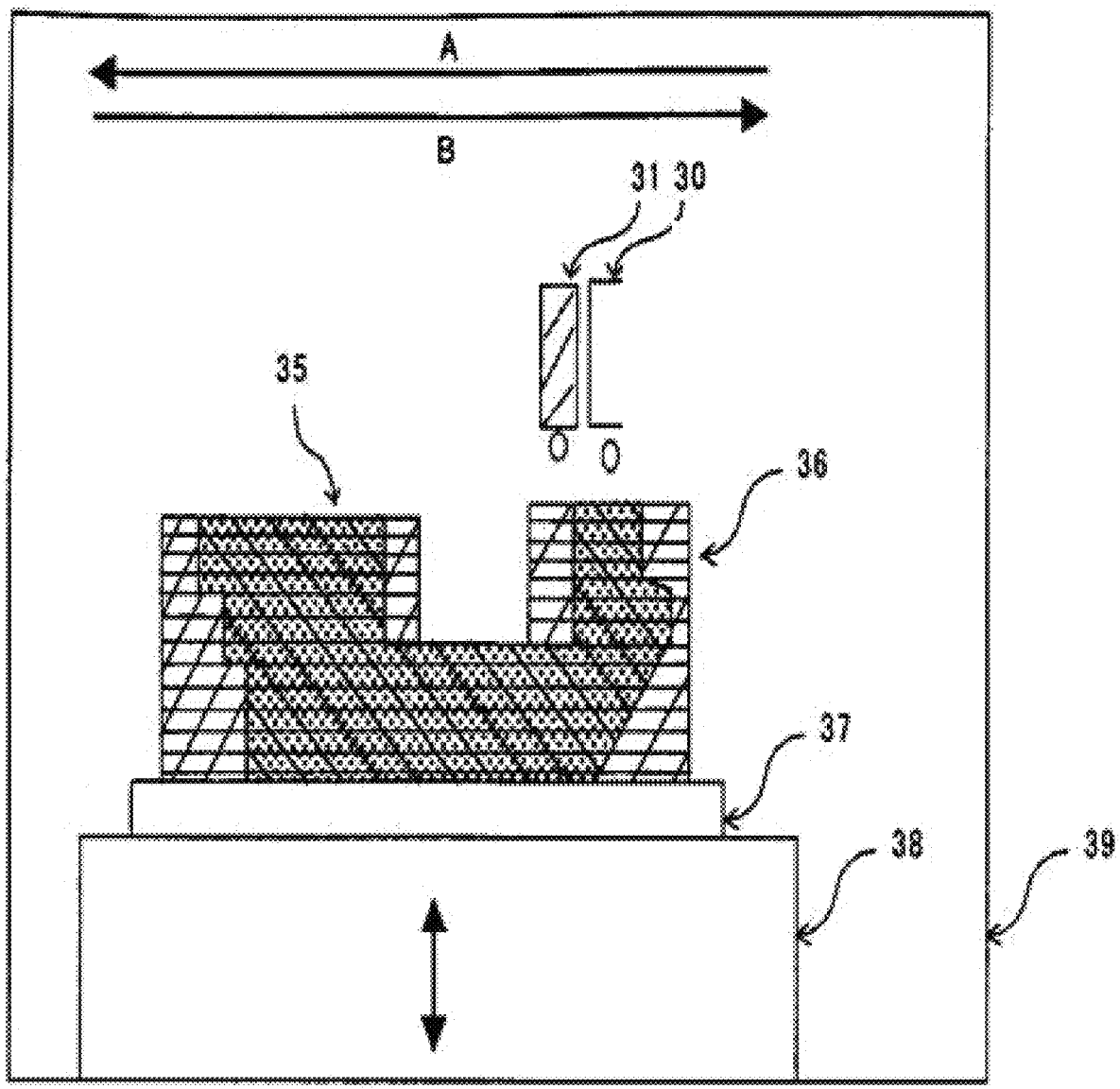
FIG. 3 illustrates a system for printing 3D articles made from high-performance polymers. In the Figure, 30 and 31 are printer heads, 35 is the 3D article made from the final polymer, 36 is the support, 37 is the build plate, 38 is a stage capable of up and down movement, and 39 is the housing.

FIG. 3 shows a typical ink jet type system for printing prepolymer solutions to manufacture 3D articles 35. The ink jet type printer can be housed in a cover 39. The build plate 37 can be placed on a lifting support 38 that can be moved in an up and down direction as needed for printing. The build plate 37 can be heated by any of the methods as described above. The printer heads 30 and 31, can be a ink jet nozzle or a syringe, deposit the prepolymer solution on the build plate 37. In one aspect, bother printer heads 30 and 31 can deposit the same prepolymer solution by moving in forward (direction A) and backwards (direction B) direction. The ability of print in a forward and backwards direction and moving the build plate in an up and down position has the ability to allow printing of complex 3D articles. Alternatively, one of the printer heads can deposit the prepolymer solution while the other printer head can eject other material such as the support 36, a second type of a prepolymer solution, or a stimulus, such as a catalyst to convert the prepolymer to the final polymer. Thus, the method has the advantage of being able to create 3D article composed of multiple dissimilar polymers, and it can create 3D articles that includes the support 36 that can be easily removed after the printing process. As will be evident to one of skill in the art, a multitude of printer heads can be used. The support 36 can be made from a suitable material that is selected due to its properties, such as ease of removal after the printing process. Thus, the support 36 can be made from glass, metal, wax, organics, or polymer that is different from the polymer comprising the 3D article.

V. Curing

The three-dimensional article obtained above can be cured to obtain the final three-dimensional article. The curing of the article can be done while it is attached to the build plate, or the curing of the article can be done by separating it from the build plate and then curing it. In the curing process, the unreacted prepolymer is converted to the final polymer. Thus, for example, if the prepolymer is poly(amic acid), the unreacted poly(amic acid) is converted to the polyimide polymer via imidization during the curing process.

In one aspect, the poly(amic acid) can be converted to a polyimide polymer by dehydration wherein water is eliminated. Imidization to produce the polyimide, i.e. ring closure in the polyamic acid, can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In another aspect, the poly(amic acid) can be converted to a polyimide polymer by chemical imidization. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the thermal imidization can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used. Further, also longer times, such as up to 10 hours may be used. Subsequently, the temperature can be increased in steps. Each step may correspond to an increase of the temperature of 10° C. to 50° C. Further, each step may have a duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Heating process with continuously increasing temperature can perform the thermal imidization. Preferably, the heating rate is slow initially but gradually increased as the temperature increases. Thus, for example, the heating process can start at 150° C. and the temperature is increased continuously until 300° C. or above is reached The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of disclosed herein are useful in circuit applications, transportation applications, and the like. For example the three-dimensional articles can be a printed circuit, an insulator, a medical construct such as an orthotic device, a dental implant, prosthetic sockets, and the like, seal rings, washers, and the like.

EXAMPLES

The examples below are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Poly(amic acid) having the following structure:

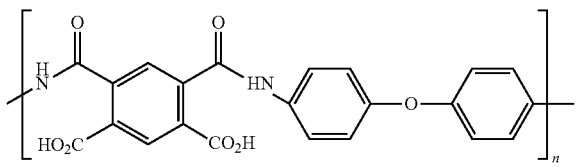

was dissolved in NMP to provide a solution containing 10% poly(amic acid) by weight. The poly(amic acid) solution was loaded into a plastic syringe mounted onto a 3D extrusion printer capable of X-Y coordinate control over the location where the poly(amic acid) solution could be deposited, and Z-axis control over a heated build plate. The build plate was heated to a temperature of 110° C. A pattern of poly(amic acid) solution was deposited onto the build plate, followed by a 10 minute holding period. A second layer was then deposited by repeating the pattern over the initial layer, followed by a 10 minute holding period. The process was repeated until four consecutive layers of the same pattern were deposited.

The article was heated to 300° C. and samples of the printed material were analyzed by thermogravimetric analysis (TGA) and Fourier transform infrared (FTIR) spectroscopy. TGA data revealed weight % loss was consisted with residual water and the solvent NMP being removed from the material, with a final decomposition temperature of about 560° C. The FTIR data showed time dependent appearance of band at ~1370 cm$^{-1}$ (imide C—N stretch), consistent with the imidization of the poly(amic acid) to the imide polymer.

The conversion of the poly(amic acid) to the imide polymer under various cure conditions was monitored using FTIR using the ratio of the band at ~1370 cm$^{-1}$ (imide C—N stretch) to the band at ~1500 cm$^{-1}$ (aromatic ring vibrations).

TABLE 1 the conversion of the poly(amic acid) to imide polymer as determined by the ratio of IR peaks at ~1370 cm$^{-1}$ to ~1500 cm$^{-1}$. Thus, under cure conditions of 4 h at 190° C., 95.6% of the poly(amic acid) has converted to the imide polymer.

| Cure conditions | IR Peak ratio | Normalized Percent |
|---|---|---|
| Poly(amic acid) (no cure) | 0.147 | 0 |
| 10 min at 190° C. | 0.754 | 86.4 |
| 2.5 h at 190° C. | 0.799 | 92.7 |

TABLE 1-continued the conversion of the poly(amic acid) to imide polymer as determined by the ratio of IR peaks at ~1370 cm$^{-1}$ to ~1500 cm$^{-1}$. Thus, under cure conditions of 4 h at 190° C., 95.6% of the poly(amic acid) has converted to the imide polymer.

| Cure conditions | IR Peak ratio | Normalized Percent |
|---|---|---|
| 4 h at 190° C. | 0.819 | 95.6 |
| 1 h at 300° C. | 0.844 | 99.1 |

The data shows that the poly(amic acid) can be converted to the imide polymer by curing it at 190° C. for 4 hours or greater or by curing it at 300° C. for 1 h.

Example 2

Figure 4:
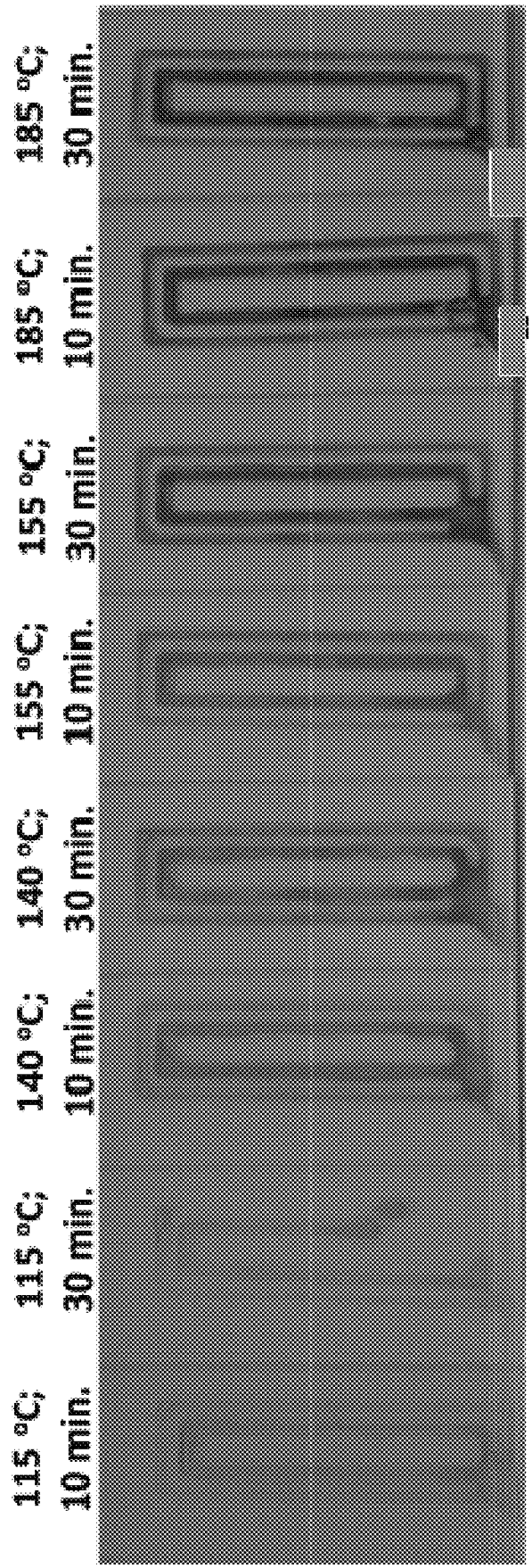
FIG. 4 illustrates the effect of different hold temperature and different hold time on the three-dimensional article.

A 10% NMP solution of poly(amic acid) having the structure shown in Example 1 was deposited onto a build plate heated to 115° C., 145° C., 155° C., or 185° C. A single layer was printed and cured for either 10 min or 30 min at each temperature. The articles thus printed are shown in FIG. 4. Examination of the articles showed that the temperature of the build plate should be below 190° C., and the hold time can be up to at least 30 minutes.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A system for printing a three-dimensional article, the system comprising:
   a solution of a prepolymer, wherein the prepolymer is a polysulfide, ketalized version of a polyketone, or a reduced form of a polyketone;
   a printing mechanism for printing the solution of the prepolymer on a build plate to form a layer of the three-dimensional article; and
   a printing controller to repeat the printing mechanism to print the solution of the prepolymer on a polymer formed by exposing the layer to a stimulus at a predetermined condition.

2. A method for manufacturing a three-dimensional article, the method comprising:
   a. printing a solution of prepolymer on a build plate, wherein the prepolymer is a polysulfide, ketalized version of a polyketone, or a reduced form of a polyketone;
   b. exposing the printed solution to a stimulus to form a polymer layer of the three-dimensional article; and
   c. repeating the steps (a)-(b) to form remainder of the three-dimensional article.

3. The method of claim 2, wherein stimulus comprises heat, light, oxidation, acid catalysis, base catalysis, transition metal catalysis, or combination thereof.

4. The method of claim 2, wherein the steps are repeated after about 5 minutes to about 15 minutes.

5. The method of claim 2, further comprising the step of curing wherein curing is done by chemical curing or thermal curing.

6. The method of claim 5, wherein the thermal curing is carried out at about 300° C. or above.

* * * * *